Nov. 25, 1958      L. S. HAMER      2,861,599
BALANCED VISIBLE WEDGE VALVE
Filed Jan. 4, 1957      2 Sheets-Sheet 2
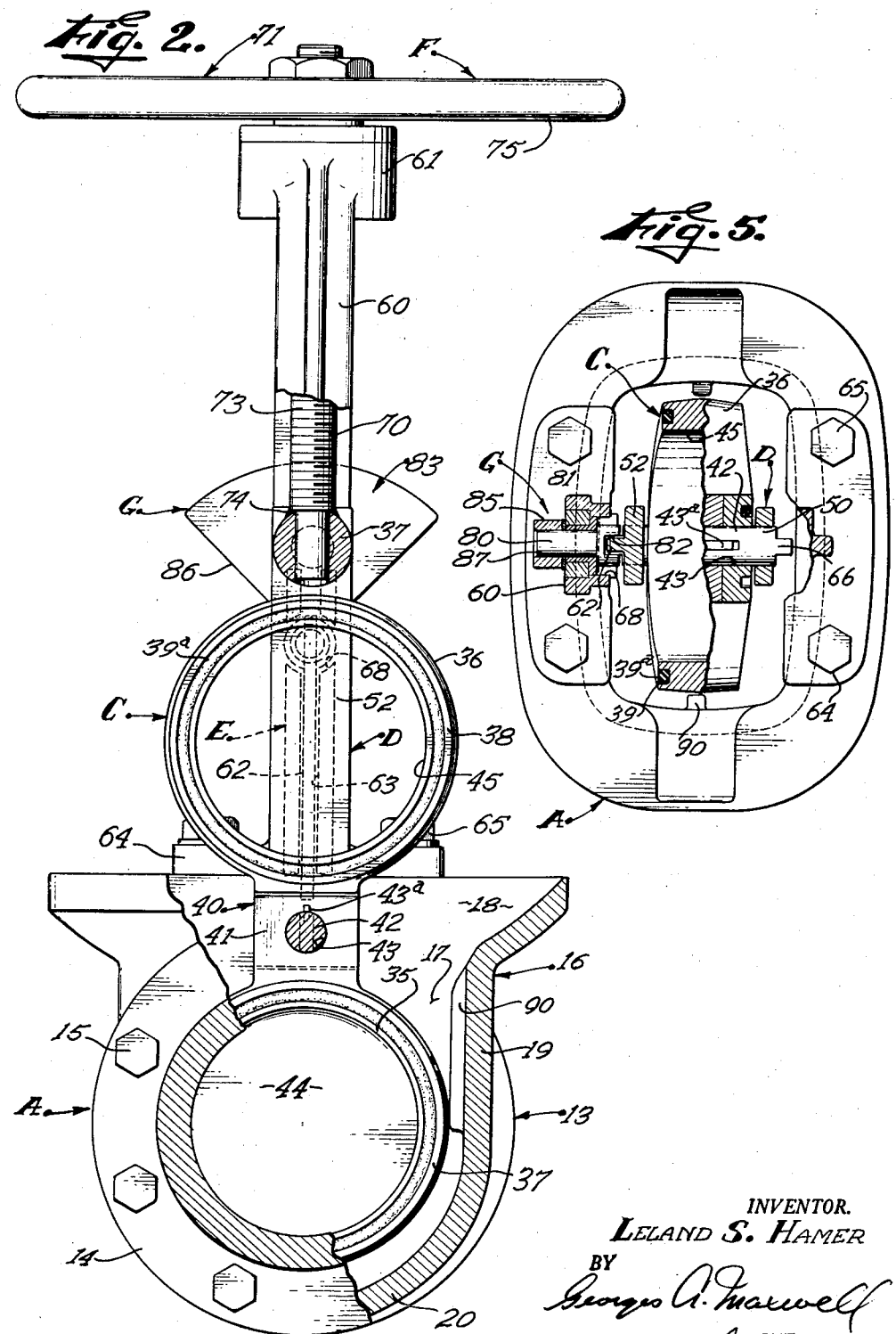
INVENTOR.
LELAND S. HAMER
BY
Georges A. Maxwell
AGENT United States Patent Office 2,861,599
Patented Nov. 25, 1958

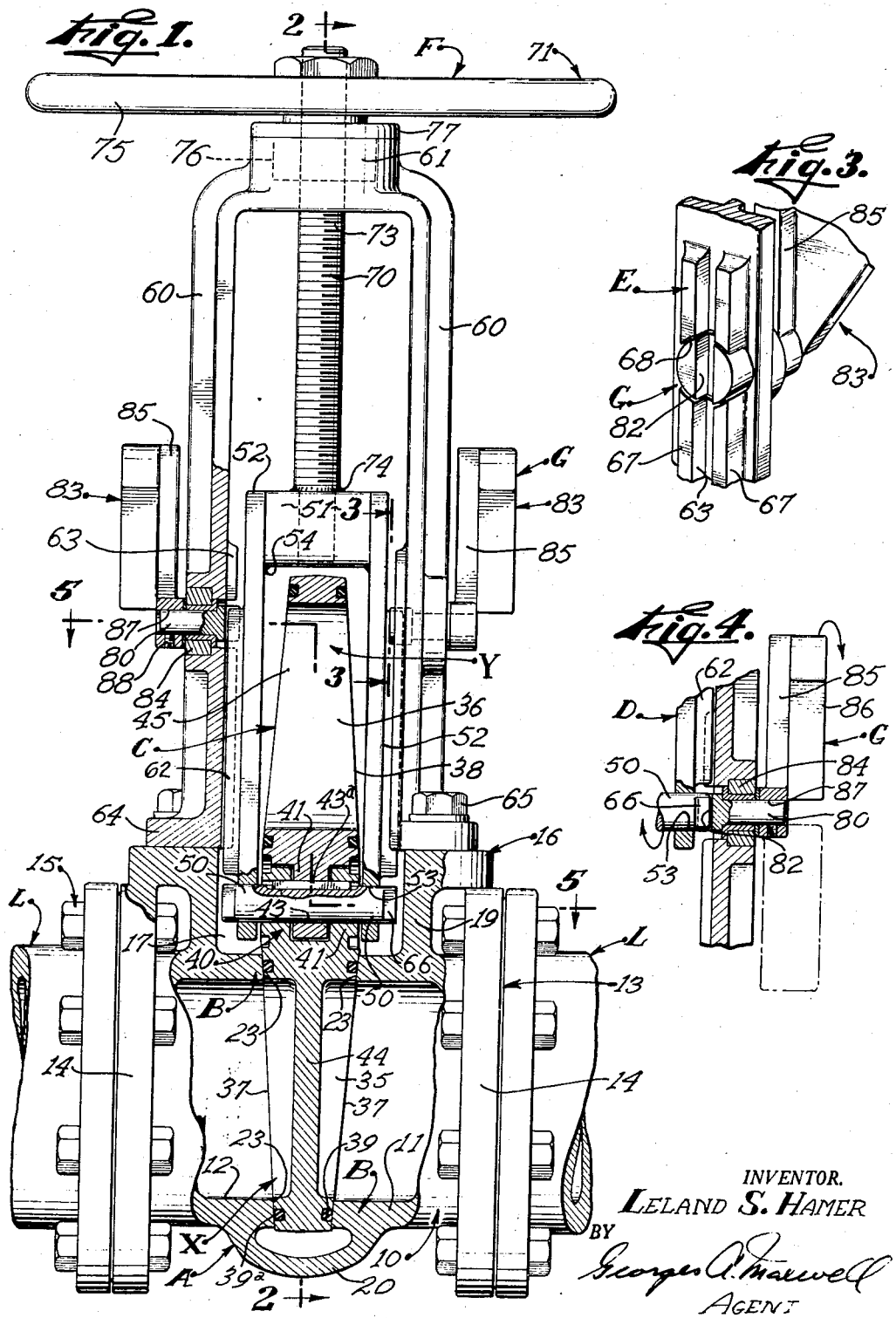

2,861,599

BALANCED VISIBLE WEDGE VALVE

Leland S. Hamer, Long Beach, Calif.

Application January 4, 1957, Serial No. 632,511

6 Claims. (Cl. 138—94.3)

This application is a continuation-in-part of applicant's co-pending application Serial No. 455,693, filed September 13, 1954, entitled "Visible Wedge Valve," and is particularly concerned with a novel balancing mechanism for a pivotally supported valving member or spectacle plate in a visible wedge valve construction.

In visible wedge valve constructions, wherein the wedges are connected or integrally joined to each other to form what is termed a spectacle plate, the differential in weight between the imperforate or blinding end of the plate is considerably greater than the other apertured end thereof, with the result that the plate is unbalanced. When such spectacle plates are pivotally supported in the valve constructions to which they are related, they are, due to their unbalanced condition, difficult to handle and operate and establish a definite hazard to those who must operate them.

In such constructions, when the spectacle plates are elevated and withdrawn from the valve body, the heavier blinding ends of the plates tend to swing and/or remain down. When the heavy blinding end of a spectacle plate swings downwardly for the reasons set forth above, it is extremely dangerous, since it could crush and mutilate the hand of the operator inadvertently left or caught in its path.

In such valve constructions for large diameter pipes, the differential in weight between the opposite ends of the spectacle plates is substantial and frequently requires the services of two men to operate them, one man to rotate and hold the spectacle plate in the proper or desired position, and the other man to operate the actuating means for shifting the plate into working position in the valve body. This is particularly true in cases where the valves are horizontally disposed and the unbalanced spectacle plates tend to swing to and remain in planes extending transverse the openings in the valve bodies in which they are adapted to be engaged.

An object of the present invention is to provide a novel means for balancing the spectacle plate of a visible wedge valve construction.

Another object of my invention is to provide a balanced valve construction of the character referred to which is safe and easy to operate and which can be easily or conveniently operated by one person.

It is a further object of my invention to provide a visible balancing mechanism which serves as an indicator which can be viewed from a distance to determine whether the valve is opened or closed.

Another object of the present invention is to provide a balancing mechanism which is easy and economical of manufacture and which is both highly effective and dependable in operation.

The various objects and features of my invention will be fully understood from the following detailed description of a typical preferred form and application of my invention, throughout which description reference is made to the accompanying drawings, in which:

Fig. 1 is a vertical sectional view through the valve construction that I provide, showing it connected in a pipe line.

Fig. 2 is a vertical sectional view of my construction, taken substantially as indicated by line 2—2 on Fig. 1.

Fig. 3 is a perspective view of a portion of the balancing mechanism of the present invention and taken substantially as indicated by line 3—3 on Fig. 1.

Fig. 4 is an enlarged detailed sectional view of a portion of the balancing mechanism.

Fig. 5 is a sectional view taken as indicated by line 5—5 on Fig. 1.

The visible wedge valve of the present invention is substantially the same as the valve construction illustrated and described in my co-pending application Serial No. 455,693, and is shown as including, generally, a body A with couplings adapted to secure the valve in a pipe line, seats B in the body, an elongate double-ended valve element or spectacle plate C adapted to be engaged with the seats B to open or close the valve, a carriage D for shiftably and rotatably supporting the valve element C, guide means E for the carriage, actuating means F adapted to shift the carriage to raise and lower the spectacle plate into and out of engagement with the seats, and balancing means G adapted to engage with and balance the spectacle plate when it is in an elevated position and ready to be rotated.

The body A is adapted to be inserted into a pipe line L and is provided to handle the flow of fluid to be controlled by the valve. The body A is characterized by an elongate tubular part 10 having a wall 11 forming a central longitudinal flow passage 12 that opens at the opposite end of the body. Couplings 13 are provided at the opposite ends of the part 10 and may be in the form of flanges 14, or the like, provided with circumferentially spaced openings for receiving suitable fasteners, such as bolts 15, or the like. It is to be understood that the ends of the part 10 may, in practice, be secured to the sections of the pipe line L in any suitable manner, as for instance, by welding, and that the particular coupling means shown is for the purpose of illustration only.

The body A further involves an extension 16 that projects laterally from the part 10, intermediate the ends thereof and forms a chamber 17 that intersects the flow passage 12. The extension 16 is vertically disposed and normal to the longitudinal axis of the body and has longitudinally spaced end walls 18 and laterally spaced side walls 19. As clearly illustrated in the drawings, the extension 16 opens upwardly and is closed at its lower side by a bottom wall 20 forming a pocket adapted to catch fluid when the valve is being operated.

The seats B are provided in the body A to cooperatively receive the valve element C hereinafter described. The seats are preferably in the nature of axially aligned longitudinally spaced extensions of the part 10 of the body and project longitudinally inwardly into the chamber 17 from the end walls 18 of the extension. The seats B establish longitudinally spaced, opposed seating faces 23 and in the preferred carrying out of the invention, the said faces are upwardly and longitudinally outwardly inclined relative to each other, as clearly illustrated in Fig. 1 of the drawings.

The valve element or spectacle plate C is an elongate part having a pair of similar flow controlling wedges 35 and 36 adapted to be selectively forced into tight seating and sealing engagement between the seats B. The wedges 35 and 36 are essentially alike and each is a flat tapered part having flat angularly related faces 37 and 38, respectively, that face in opposite directions longitudinally of the body A and which are adapted to have flat seating engagement with the faces 23 on the seats. The faces 37 and 38 are outwardly convergent and may be circular in configuration as shown in Fig. 2 of the drawings, and are connected together at their inner or adjacent ends by an arm 40. In practice, and to simplify manufacture of the wedges, the wedges 35 and 36 may be separate parts, in which case the wedges have ears 41 projecting laterally therefrom and overlapped with each other in a manner to establish the arm 40.

The ears 41 are shaped so that they are keyed together and they are fastened against separation by a pin 42 that passes through registering openings 43 which are provided in the ears. In the particular case illustrated the wedges are held against rotation about the pin 42 by a suitable key 43ª.

In the case illustrated the faces 37 and 38 of the wedges 35 and 36 are provided with annular grooves 39 and in which suitably resilient sealing rings 39ª are engaged.

The spectacle plate C is provided to open and close the flow passage 12 and, therefore, the spectacle plate is reversible, having an imperforate section X and a perforate section Y. As illustrated, the wedge 35 forms the section X and is provided with a wall 44, while the wedge 36 forms the section Y and is provided with an opening 45, which opening corresponds with the diameter of the flow passage 12. When the wedge 35 is in seating engagement with seats B, the wall 44 positively closes or shuts off flow through the passage 12, and when the wedge 36 is in seating engagement with the seats, the opening 45 forms a continuation of the flow passage 12, allowing for full, free flow through the body A of the valve.

The carriage D is provided to shiftably and rotatably carry the spectacle plate C, to selectively shift the wedges 35 and 36 thereof into and out of the chamber 17 where the wedges cooperate with the seats B to open or close the flow passage 12. As clearly illustrated in the drawings, the pin 42 coupling the wedges together, extends longitudinally of the body on an axis, spaced from the central axis of the body, and is provided at its opposite ends with bearings 50. The carriage D involves generally, a head 51 positioned above the spectacle plate C and a pair of like longitudinally spaced arms 52 that depends from the head to occur adjacent the opposite end faces of the uppermost wedge of the spectacle plate and engage the bearings 50 of the pin 42, to carry the spectacle plate.

Aligned bearing openings 53 are provided at the lower ends of the arms 52 to slidably receive the bearings 50. The head 51 and the arms 52 are shown as being integrally joined or fixed together as by welding 54.

The guide means E is provided to restrict the carriage D to move vertically of the structure and involves a pair of supports 60, a header 61 carried by the supports, an elongate rail 62 on each arm of the carriage and a channel 63 extending longitudinally of the supports to cooperate with the rails 62 so that the carriage is held against rotation. The supports 62 are vertically disposed and project upwardly from the end walls of the extension to occur adjacent the arms 52 of the carriage. In practice, the supports 60 are carried by an aperture base plate 64 secured to the upper open end of the extension 16 by suitable fasteners 65 and through which the wedges 35 and 36 of the spectacle plate may be readily withdrawn from the chamber and rotated end for end.

The guide means E that I provide further includes keys 66 at the ends of the pin 42, which keys project from the arms of the carriage and into sliding engagement with the channels 63 in the supports and normally prevent the spectacle plate from rotating. The channels 63 in the supports 60 are established by a pair of laterally spaced parallel ribs 67. The ribs 67 establishing the channels 63 are provided with opposed recesses 68 at a predetermined position above the base plate 64 and so that when the spectacle plate C is completely withdrawn from the chambers 17, the keys 66 at the ends of the pin 42 register with recesses 68 and the spectacle plate is free to rotate.

The header 61 is carried at the uppermost ends of the supports 60 to tie the supports together and to carry parts of the operating means E, hereinafter described. As shown, the base plate 64, supports 60 and the head may be integrally formed as by casting.

In order to raise and lower the carriage D and spectacle plate C, I have provided the operating means F which means is adapted to apply the necessary force required to handle or move the spectacle plate C. As shown, the means F involves generally, an operating stem 70 fixed to and projecting upwardly from the head 51, and a manually operable means 71 carried by the header 61 for shifting the stem 70 vertically. The operating stem 70 extends vertically of the structure between the supports 60 and is an elongate part, round in cross-section and is provided with screw threads 73. The stem is fixed to the head 51, as by welding 74, to be held against rotation relative thereto.

The manually operable means 71, adapted to move or shift the stem 70 and the carriage D vertically upwardly and downwardly relative to the body, preferably involves a hand wheel 75 that drives an internally threaded nut 76 engaged with the stem and held in fixed vertical position in an by the header 61. The nut 76 is confined in a recess in the header 61 by a suitable retainer 77.

With the structure thus far described it will be apparent that the wedges 35 and 36 can be selectively raised and lowered into and out of engagement in the body A by the carriage D and the operating means F. That is, the spectacle plate C may be raised to a position where it is free to rotate and so that the desired wedge thereof may be selected, and may be lowered and forced into seating engagement with the seats B in the body.

It will be apparent that with the structure thus far described, the spectacle plate C is out of balance, that is, the wedge 35 of the plate with the wall 44 is heavier than the apertured wedge 36 of the plate. As a result of this unbalanced condition, it will be apparent that when the spectacle plate is elevated to a position where it is free to rotate, and the heavier wedge 35 thereof is uppermost or on top, the wedge 35 will tend to swing down, rotating the spectacle plate and creating a hazard to the person operating the valve as well as making the task of operating the valve more cumbersome and difficult.

The balancing means G that I provide is adapted to counter-balance the spectacle plate C to overcome the above tendency for the heavier wedge 35 of the spectacle plate C, to shift or swing downwardly when the plate is elevated for rotation, and involves generally, a pivot pin 80 rotatably carried by each support 60 to extend parallel to the longitudinal axis of the body A and the pin 42 of the spectacle plate C, an enlarged head 81 at one end of each pivot pin to occur within the recess 68 in the channel 63 in the support to which it is related and having a slot 82 therein to normally register with the channel and accommodate the rail 62 of the carriage arm related thereto, and a counter-balance weight 83 fixed to the other end of each pivot pin, to occur outside of the confines of the supports 60. The weights 83 of the means G correspond in weight to the weight differential between the wedges 35 and 36 of the spectacle plate.

The pivot pins 80 are rotatably carried and retained in the supports 60 by suitable bearings 84. The counter-balance weights 83 are shown as including arms 85 carried by the pivot pin 80 and suitable bodies of metal 86 carried by the arms. The arms 85 are provided with openings 87 at one end to receive the outer ends of the pivot pins 80 and are fixed to the pins by set screws 88, to project laterally therefrom. In the preferred carrying out of the invention the bodies or masses of metal 86 of the counter-balance weights 83 are secured to the arms 85 as by welding and are formed in a distinctive shape so that a person, at a considerable distance, can determine the relative positioning of the balancing means and thereby know the position in which the spectacle plate C is arranged relative to the body.

The counter-balance weights 83 are arranged to project from the pivot pins 80 in the same direction in which the lighter, apertured wedge 36 projects from the pin 42 of the spectacle plate. The rails 62 on the arms of the carriage D normally engage in the slots 82 in the heads 81 of the means G and prevent the pins 80 and the weights 83 from rotation. When the spectacle plate is raised to the position where it is free to rotate, that is, when it is raised to a position where the keys 66 on the ends of the pin 42 occur adjacent the recesses 68 in the guide channels in the supports, the rails 62 are shifted out of engagement from the notches 82 in the heads of the pivot pins 80 and the keys on the ends of the pin 42 are shifted into keyed engagement with the said notches in the heads of the pivot pins.

With the above relationship of parts, it will be apparent that the counter-balance means G, which remains in fixed vertical position relative to the body A, is maintained in proper position relative to the spectacle plate C when the plate is lowered into engagement with the body and is only free to rotate when the plate C is elevated and the keys 66 on the pin 42 of the spectacle plate engage in the notches in the pivot pins 80 and the said pin and pivot pins are in axial alignment.

In the particular case illustrated, when the spectacle plate C is lowered and fully engaged in the body A, the pin 42 occurs with the chamber 17 and below the base plate 64 and the keys on the pin are shifted out of engagement with the channels of the supports 60, which project upwardly from the base plate. When this happens and to prevent misalignment of the spectacle plate and its keys 66 with the channel, I provide suitable guide ribs 90 on the side walls of the extension, which ribs are adapted to slidably engage and guide the wedge of the spectacle plate occurring within the chamber 17, and until it is elevated to a position where the keys 66 engage in the channels.

It is to be understood that in practice, the balancing means G could include but one pivot pin 80 and counter-balance weight 83 related to one support 60 and arm 52, and that the particular from of the invention shown and described is only illustrative of one means of carrying out of the invention.

It will be apparent from the foregoing, that I have invented a simple, practical balancing mechanism for a spectacle plate in a visible wedge valve construction, which balancing mechanism materially reduces the skill required to operate such a valve and materially reduces the hazards ordinarily confronted in the operation of such valves.

Having described only a typical preferred form and application of my invention, I do not wish to be limited to the specific details herein set forth, but wish to reserve to myself any variations of modifications that may appear to those skilled in the art, and fall within the scope of the following claims.

Having described my invention, I claim:

1. A valve construction of the character referred to including, an elongate body having a central longitudinal flow passage, an extension on the body and defining a laterally opening chamber intersecting the flow passage, longitudinally spaced seats in the chamber, a spectacle plate having spaced valving wedges adapted to be selectively engaged with the seats, and an arm extending between and connecting the wedges, one wedge being perforate and the other wedge being imperforate and heavier than the perforate wedge, a pin fixed to the arm of the spectacle plate, a laterally shiftable carriage pivotally engaged with the pin on the plate, a support projecting laterally from the extension on the body to occur adjacent the carriage and having a channel opposing the carriage, a key on the pin of the spectacle plate and engageable in the channel in the support and adapted to normally prevent rotation of the spectacle plate relative to the carriage and the body, and counter-balance means including, a pivot pin rotatably carried by the support to project therethrough and intersecting the channel therein at a point spaced laterally of the body and having a notch at its end to normally register with the channel, and a counter-balance fixed tto the other end of the pin, and actuating means adapted to shift the carriage relative to the support and the body, the spectacle plate being adapted to be rotated when the key on the pin engages in the notch in the pivot pin of the counter-balance means.

2. A valve construction of the character referred to including, an elongate body having a central longitudinal flow passage, an extension projecting laterally from the body and defining a laterally opening chamber intersecting the flow passage, a pair of longitudinally spaced seats in the chamber, a spectacle plate having spaced valving wedges with oppositely disposed end faces adapted to be selectively engaged in the chamber and with the seats, and an arm extending between and connecting the wedges, one wedge being perforate and the other wedge being imperforate and heavier than the perforate wedge, a pin fixed to the arm of the spectacle plate, an elongate laterally shiftable carriage pivotally engaged with the pin on the plate, a support projecting laterally from the extension on the body to occur adjacent the carriage and having a channel opposing the carriage, a rail on the carriage and engaged in the channel to guide the carriage relative to the body, a key on the pin of the spectacle plate and engageable in the channel in the support and adapted to normally prevent rotation of the spectacle plate relative to the carriage and the body, and counter-balance means including, a pivot pin rotatably carried by the support to project therethrough and intersect the channel therein at a point spaced laterally of the body and having a notch at its end to normally register with the channel and to normally slidably receive the rail engaged in said channel, and a counter-balance fixed to the other end of the pin, and actuating means adapted to shift the carriage relative to the support and the body, the spectacle plate being adapted to be rotated when the key on the pin engages in the notch in the pivot pin of the counter-balance means.

3. A valve construction of the character referred to including, an elongate body having a central longitudinal flow passage, an extension projecting laterally from the body and defining a laterally opening chamber intersecting the flow passage, longitudinally spaced seats in the chamber, a spectacle plate having spaced valving wedges adapted to be selectively engaged in the chamber and with the seats, and an arm extending between and connecting the wedges, one wedge being perforate and the other wedge being imperforate and heavier than the perforate wedge, a laterally shiftable carriage having spaced arms embracing the spectacle plate, a pin fixed to the arm of the spectacle plate and pivotally engaged with the arms of the carriage, a pair of supports projecting laterally from the extension on the body to occur adjacent the arms of the carriage and having channels opposing the said arms of the carriage, keys on the ends of the pin of the spectacle plate and engageable in the channels in the supports and adapted to normally prevent rotation of the spectacle plate relative to the carriage and the body, and counter-balance means including, a pivot pin rotatably carried by each support to project therethrough and intersect the channels therein at a point spaced laterally of the body and having a notch at one end to normally register with the channel related thereto, a counter-balance fixed to the other end of the pin, and actuating means adapted to shift the carriage relative to the supports, the spectacle plate being adapted to be rotated when the keys on the pin engage in the notches in the pivot pins of the counter-balance means.

4. A valve construction of the character referred to including, an elongate body having a central longitudinal flow passage, an extension projecting laterally from the body and defining a laterally opening chamber intersecting the flow passage, a pair of longitudinally spaced annular seats in the chamber, a spectacle plate having spaced valving wedges with oppositely disposed end faces adapted to be selectively engaged in the chamber and with the seats, and an arm extending between and connecting the wedges, one wedge being perforate and the other wedge being imperforate and heavier than the perforate wedge, a laterally shiftable carriage having spaced arms to occur adjacent the opposite faces of the wedges, a pin fixed to the arm of the spectacle plate and pivotally engaged with the arms of the carriage, a pair of supports projecting laterally from the extension on the body to occur adjacent the arms of the carriage and having channels opposing the said arms of the carriage, rails on the arms of the carriage relative to the body, keys on the ends of the pin of the spectacle plate and engageable in the channels in the supports and adapted to normally prevent rotation of the spectacle plate relative to the carriage and the body, and counter-balance means including, a pivot pin rotatably carried by each support to project therethrough and intersect the channels therein at a point spaced laterally of the body and having a notch at one end to normally register with the channel related thereto and to normally slidably receive the rail engaged in the said channel, and a counter-balance fixed to the other end of the pin, and actuating means adapted to shift the carriage relative to the supports, the spectacle plate being adapted to be rotated when the keys on the pin engage in the notches in the pivot pins of the counter-balance means.

5. A valve construction of the character referred to including, an elongate horizontally disposed body having a central longitudinal flow passage, an extension projecting laterally from the body and defining an upwardly opening chamber intersecting the flow passage, longitudinally spaced seats in the chamber, a spectacle plate having vertically spaced valving wedges with oppositely disposed end faces adapted to be selectively engaged in the chamber and with the seats, and an arm extending between and connecting the wedges, one wedge being perforate and the other wedge being imperforate and heavier than the perforate wedge, a vertically shiftable carriage including, a head above the spectacle plate and longitudinally spaced arms depending from the head to occur adjacent the opposite end faces of the spectacle plate, a longitudinally disposed pin fixed to the arm of the spectacle plate and pivotally engaged with the arms of the carriage, a pair of longitudinally spaced supports projecting upwardly from the extension on the body to occur adjacent the arms of the carriage, one of said supports having a channel opposing the arm of the carriage related thereto, a rail on the arm of the carriage adjacent said support with a channel and slidably engaged in the channel to guide the carriage vertically relative to the body, a key on the pin of the spectacle plate and engageable in the channel and adapted to normally prevent rotation of the spectacle plate relative to the carriage and the body, and counter-balancing means including, a longitudinally disposed pivot pin rotatably carried by said support with the channel to project therethrough and intersect the channel therein at a point spaced above the central longitudinal axis of the body and having a notch at one end to normally register with the channel related thereto and to slidably receive the rail of the carriage engaged in said channel, and a counter-balance fixed to the other end of the pivot pin to project radially therefrom, and actuating means at the upper ends of the supports and adapted to shift the carriage relative to the supports and the body, the spectacle plate being adapted to be rotated when the plate is raised out of engagement with the body and the key on the pin engages in the notch in the pivot pin of the counter-balance means.

6. A valve construction of the character referred to including, an elongate horizontally disposed body having a central longitudinal flow passage, an extension projecting laterally from the body and defining an upwardly opening chamber intersecting the flow passage, a pair of longitudinally spaced seats in the chamber, a spectacle plate having vertically spaced valving wedges with oppositely disposed end faces adapted to be selectively engaged in the chamber and with the seats, and an arm extending between and connecting the wedges, one wedge being perforate and the other wedge being inperforate and heavier than the perforate wedge, a vertically shiftable carriage, a head spaced above the spectacle plate having longitudinally spaced arms to occur adjacent the opposite end faces of the wedges, a longitudinally disposed pin fixed to the arm of the spectacle plate and pivotally engaged with the arms of the carriage, a pair of longitudinally spaced supports projecting upwardly from the extension on the body to occur adjacent the arms of the carriage and having channels opposing the said arms of the carriage, rails on the arms of the carriage and slidably engaged in the channels to guide the carriage vertically relative to the body, keys on the opposite ends of the pin of the spectacle plate and engageable in the channels in the supports and adapted to normally prevent rotation of the spectacle plate relative to the carriage and the body, and counter-balancing means including, a longitudinally disposed pivot pin rotatably carried by each support to project therethrough and intersect the channels therein at a point spaced above the central longitudinal axis of the body and having a notch at one end to normally register with the channel related thereto and to slidably receive the rail of the carriage engaged in said channel, and a counter-balance fixed to the other end of the pivot pin to project radially therefrom, and actuating means at the upper ends of the supports and adapted to shift the carriage relative to the supports and the body, the spectacle plate being adapted to be rotated when the plate is raised out of engagement with the body and the keys on the pin engaged in the notches in the pivot pins of the counter-balance means.

References Cited in the file of this patent

UNITED STATES PATENTS

| Number | Name | Date |
|---|---|---|
| 768,393 | McArthur | Aug. 23, 1904 |
| 2,615,473 | Hamer | Oct. 28, 1952 |
| 2,693,110 | Terrell | Nov. 2, 1954 |
| 2,726,683 | Steinbach | Dec. 13, 1955 |
| 2,743,742 | Muff | May 1, 1956 |